United States Patent [19]

Magori

[11] Patent Number: 6,052,080
[45] Date of Patent: Apr. 18, 2000

[54] RANGEFINDER

[75] Inventor: Valentin Magori, München, Germany

[73] Assignee: Siemens Aktiengesellschaft, Munich, Germany

[21] Appl. No.: 09/029,911

[22] PCT Filed: Sep. 6, 1996

[86] PCT No.: PCT/DE96/01673
§ 371 Date: Mar. 9, 1998
§ 102(e) Date: Mar. 9, 1998

[87] PCT Pub. No.: WO97/09637
PCT Pub. Date: Mar. 13, 1997

[30] Foreign Application Priority Data

Sep. 7, 1995 [DE] Germany .......................... 195 33 124

[51] Int. Cl.$^7$ ................................................ G01S 13/32
[52] U.S. Cl. ........................ 342/118; 342/128; 342/129
[58] Field of Search .................................... 342/118, 122, 342/128, 129

[56] References Cited

U.S. PATENT DOCUMENTS

| 4,054,878 | 10/1977 | Diehl | 342/142 |
|---|---|---|---|
| 4,682,175 | 7/1987 | Lazarus | 342/165 |
| 4,860,017 | 8/1989 | Grudkowski | 342/201 |
| 5,164,734 | 11/1992 | Fredericks et al. | 342/172 |

FOREIGN PATENT DOCUMENTS

| 27 10 841 | 3/1977 | Germany . |
|---|---|---|
| 3438053 A1 | 10/1984 | Germany . |
| CH 652832 A5 | 9/1980 | Liechtenstein . |

OTHER PUBLICATIONS

"Taschenbuch der Hochfrequenztechnik", Grunlagen, Lomponenten Systeme, Lange et al., pp. S3–S4.
Bauelements Der Elektronik, "Signalvererbeitung mit akustischen Oberflachenwellen", pp. 263–267.

*Primary Examiner*—John B. Sotomayor
*Attorney, Agent, or Firm*—Hill & Simpson

[57] ABSTRACT

For improving the measuring precision, a reference unit (REF) is juxtaposed with a continuous wave radar (DSR). This reference unit (REF) comprises a surface wave element (OFW) for generating a signal delayed relative to the transmission signal. A mixed signal is formed from the delayed signal and the transmission signal with a mixer (MI2), this mixed signal being utilized in combination with the measured signal stemming from the continuous wave radar (DSR) for determining the distance.

7 Claims, 2 Drawing Sheets

RANGEFINDER

The invention is directed to an apparatus for distance measurement.

A continuous wave radar, which is also referred to as FMCW radar. is known from the Prior Art of Meinke, Gundlach, *Taschenbuch der Hocfrequenztechnik*, 5$^{th}$ Edition, Springer-Verlag, Chapter S 3. The abbreviation FM stands for frequency modulation and CW stands for continuous wave. FIG. 1 shows such a continuous wave radar. A modulator MOD generates a modulating signal that is supplied to a voltage-controlled oscillator VCO. An optimally linearly frequency-modulated signal should be adjacent at the output of the voltage-controlled oscillator VCO. Insofar as the frequency-voltage characteristic of the voltage-controlled oscillator VCO exhibits a non-linearity, referenced NLIN in the f-u diagram, the modulating signal stemming from the modulator MOD is to be correspondingly pre-distorted, as indicated with the signal curve VNLIN in the u-t diagram of the modulator MOD. When the voltage-controlled oscillator VCO exhibits a linear characteristic LIN, a linear characteristic is to be selected for the modulator MOD. The linearly frequency-modulated signal stemming from the voltage-controlled oscillator VCO is conducted over a circulator ZIR and beamed out by an antenna A. The beamed-out signal is reflected by a test subject MO located at the distance I from the antenna A and is received by the antenna A. This received signal proceeds via the circulator ZIR onto a mixer MI that mixes this received signal with the transmission signal present at the moment. The difference frequency $\Delta f_{DIF}(t)$ is a measure for the distance L of the test subject MO from the antenna A. Measuring errors arise, however, when the frequency-modulated transmission signal deriving from the voltage-controlled oscillator does not exhibit a linear f-t characteristic.

A correction of the non-linearity of the f-u characteristic of the voltage-controlled oscillator VCO is not always possible or involves a high outlay.

An object of the invention is to specify an apparatus for distance measurement wherein a potentially existing non-linearity in the frequency-modulated output signal of the voltage-controlled oscillator remains without influence on the measuring precision.

The object is achieved by an apparatus according to patent claim 1.

Advantageous developments of the invention derive from the subclaims.

When the isolation of the circulator is too low, a further antenna can be provided that serves for the reception of the reflected signal. This development is recited in claim 3.

When transmission power is to be prevented from also being adjacent at the mixer, a circulator can be connected between the signal source, the mixer and the antenna, see claim 4 with respect thereto. The development according to claim 3 also fulfills this purpose.

The development according to claim 5 has the advantage that a major part of the sensor components can be operated in a lower-frequency range with reference to the transmission frequency. This is more manipulatable in practice.

The development according to claim 6 likewise serves for better manipulation when the signal source generates a signal whose frequency is higher than the frequency at which the signal processing should ensue.

The development according to claim 9 serves for the suppression of noise sources. Additional, neighboring apparatus for distance measurement can be distinguished from one another with this development.

The invention is explained in greater detail below with reference to a number of Figures.

Figure 1:
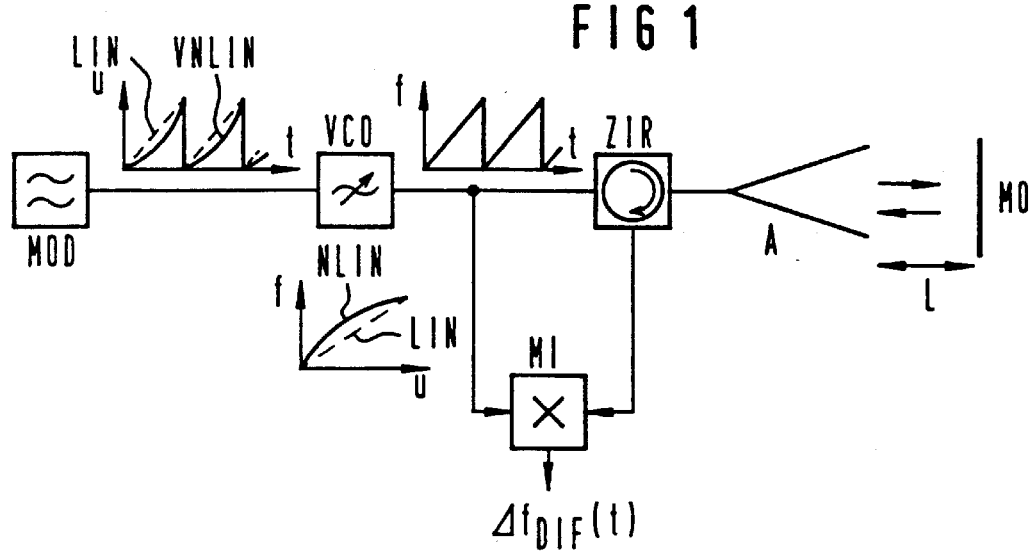
FIG. 1 shows a continuous wave radar as known from the Prior Art.
Figure 2:
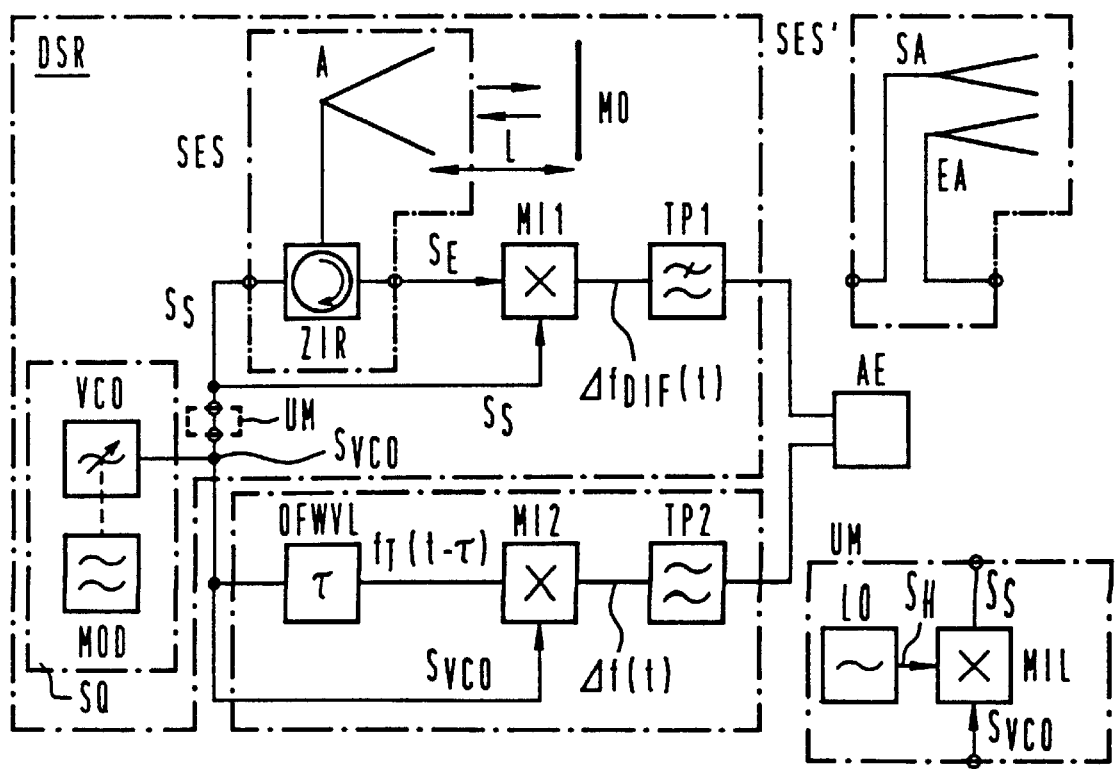
FIG. 2 shows the basic structure of the inventive apparatus for distance measurement.

According to FIG. 2, the inventive apparatus for distance measurement comprises a signal source SQ that contains a modulator MOD and a voltage-controlled oscillator VCO. The voltage-controlled oscillator VCO generates a not necessarily linearly frequency-modulated signal $S_{VCO}$ with the frequency $f_{VCO}(t)$:

$$f_{VCO}(t) = f_c + \dot\psi \cdot t$$

linear tuning:

$$\dot\omega = \frac{\Delta f_c}{T} \quad \text{for } 0 < t < T$$

whereby:

$f_c$ = carrier frequency $\dot\psi$ = variation of the frequency dependent on the time $\Delta f_c$ = frequency shift T = period of a tuning event The converter UM shown at the lower right in FIG. 2 is not subsequently used. Therefore valid is: The transmission signal $S_s$ with the momentary frequency $f_T(t)$ that is adjacent at the input of the circulator ZIR is the same as the signal with the frequency $f_{VCO}(t)$, i.e.: $f_T(t) = f_{VCO}(t)$ and $S_{VCO} = S_S$. This frequency-modulated signal with the momentary frequency $f_T(t)$ is adjacent at a transmission/reception unit SES that comprises the circulator ZIR and an antenna A. The signal beamed out by the antenna A and reflected at the test subject MO is received by the antenna A and conducted to a first mixer MI1 via the circulator ZIR. The transmission signal $S_S$ with the momentary frequency $f_T(t)$ is additionally adjacent at this first mixer MI1. The difference frequency $\Delta f_{DIF}(t)$ formed by the first mixer MI1 from the two frequencies $f_T(t-t_L)$ and $f_T(t)$ is supplied to an evaluation unit AE via a first low-pass TP1. A reference unit REF, also referred to as reference branch, is juxtaposed with this unit referred to as continuous wave radar DSR or as measuring branch, as well. The reference unit REF is supplied with the frequency-modulated signal $S_{VCO}$ having the momentary frequency $f_T(t)$ (=$f_{VCO}(t)$) that is generated by the voltage-controlled oscillator VCO. The reference unit REF comprises a surface wave element OFW that forwards the frequency-modulated signal to a second mixer MI2 delayed by the time duration τ. This forms the difference frequency $\Delta f(t)$ from the two frequencies $f_T(t-T)$ and $f_T(t)$. The difference frequency $\Delta f_{DIF}(t)$ that stems from the continuous wave radar as well as the difference frequency $\Delta f(t)$ that stems from the reference unit REF are both conducted to the evaluation unit AE. The phase shift $\phi_{DSR}$ at the output of the continuous wave radar DSR derives as:

$$\varphi_{DSR}(t) = \frac{t_L \cdot \Delta f_{DIF}(t)}{2\pi} \tag{1}$$

whereby:

$t_L$ = signal running time on the measuring path. The phase shift $\phi_{REF}$ at the output of the reference unit REF derives as:

$$\varphi_{REF}(t) = \tau \cdot \frac{\Delta f(t)}{2\pi} \quad (2)$$

whereby:

τ=delay duration of the delay line.

The following relationships exist between the signals in the reference branch REF and the signals in the measuring branch DSR:

The delay duration τ referred to the difference frequency Δf(t) at the output of the second mixer MI2 is equal to the signal running time $t_L$ referred to the difference frequency $\Delta f_{DIF}(t)$ at the output of the first mixer MI1. Accordingly, the signal running time $t_L$ derives as:

$$t_L = \frac{\varphi_{DSR}(t)}{\varphi_{REF}(t)} \cdot \tau \quad (3)$$

The signal running time $t_L$ on the measuring path derives from the measured phase curves on the measuring branch DSR and on the reference branch REF and from the exactly known delay duration τ of the surface wave element OFW. This relationship can be interpreted by microprocessors, particularly digital signal processors, in the evaluation unit AE. This interpretation can ensues in various ways:

1$^{st}$ Possibility

Based on the signal stemming from the second mixer MI2 with the difference frequency Δf(t) between input and output signal of the reference branch, the frequency characteristic thereof can be determined dependent on the time. Since the curve of the signal stemming from the first mixer MI1 with the difference frequency $\Delta f_{DIF}(t)$ follows the same characteristic, a mixed signal for an arbitrarily variable test subject distance L can thus be synthesized. That distance L for which the best coincidence between the signals derives can be found by a comparison of the signals calculated in this way with that of the measuring path on the basis of correlation or evaluation according to the least error square between the two signals. This means that the actual subject distance corresponds to the value for the distance L given best coincidence.

A coincidence or, respectively, a best similarity for a plurality of distances derives given a plurality of detected subjects.

2$^{nd}$ Possibility

When tuning (sweeping) the signal source SQ, a quasi-periodic with many periods (given a long delay duration τ) derives in the reference branch REF as signal with the difference frequency Δf(t). Sampling pulses are generated from this signal at specific phase angles (preferably zero-axis crossings), these sampling pulses determining the points in time at which the signal with the difference frequency $\Delta f_{DIF}(t)$ stemming from the measuring branch DSR is sampled. The sampled values are digitized and loaded into a memory together with the points in time of the occurrence of the samples. The same signal curve derives as memory content that would have derived with a constant sampling or read-in rate given time-linear frequency modulation. Given readout of the memory with a constant clock rate, accordingly, a signal derives that would also have derived given a linear frequency modulation (FM).

Given an analog storing, for example in a bucket brigade memory, an analogous procedure would lead to analogous results.

3$^{rd}$ Possibility

The measured as well as the reference signal can, further, be read into a memory with a constant sampling rate. Points in time with predetermined phase angles (preferably zero-axis crossings, i.e. 180°) are calculated from the stored reference signal. The appertaining values of the measured values are read out at exactly these points in time. When these values are read out with a constant clock rate, then a signal as would derive given exactly linear frequency modulation derives.

The further-processing of the signals obtained in this way can then also be implemented with those methods that are employed for the processing of the signals given an exactly linearly frequency-modulated signal source SQ.

A converter UM, as shown at the lower right in FIG. 2, can be inserted at the location referenced UM at the left in FIG. 2. The converter UM comprises a local oscillator LO that generates a signal $S_H$ with a frequency $f_H$ that is higher than the frequency $f_{VCO}(t)$ that stems from the voltage-controlled oscillator VCO. This signal $S_H$ with the frequency $f_H(t)$ is stepped up at a mixer MIL with the signal stemming from the voltage-controlled oscillator VCO. The reception signal is stepped down homodyne into the base band with the transmission signal. The reference branch REF is operated at the intermediate frequency at which the voltage-controlled oscillator VCO generates the frequency-modulated signal with the frequency $f_{VCO}(t)$.

Both a monostatic arrangement SES as well as a bistatic antenna arrangement SES' can be employed for the transmission/reception stage SES of the measuring branch DSR. Given the monostatic arrangement SES, the transmission signal and the reception signal are separated by the circulator ZIR or by a directional coupler following the common transmission and reception antenna SA. In the bistatic antenna arrangement SES' and transmission antenna SA and a reception antenna EA is [sic] provided.

Insofar as the sampling of the measured signal ensues at every zero point of the reference signal, the delay duration τ for both the direct sampling as well as for the computational sampling must be at least as long as the signal running time $t_L$ in order to satisfy the sampling theorem of Shannon.

When other evaluation methods are selected, the delay duration τ can also be shorter than the maximum signal running time $t_L$.

When only a real signal is needed, the mixers shown in FIG. 2 can be can be implemented as simple mixers. When a complex signal is needed, the mixers MI1, MI2 and MI3 in both the measuring branch and in the reference branch can be implemented as IQ mixers.

Complex signals can also be computationally acquired with Hilbert transformation from the real time signal. IQ mixers can then be omitted.

Figure 3:
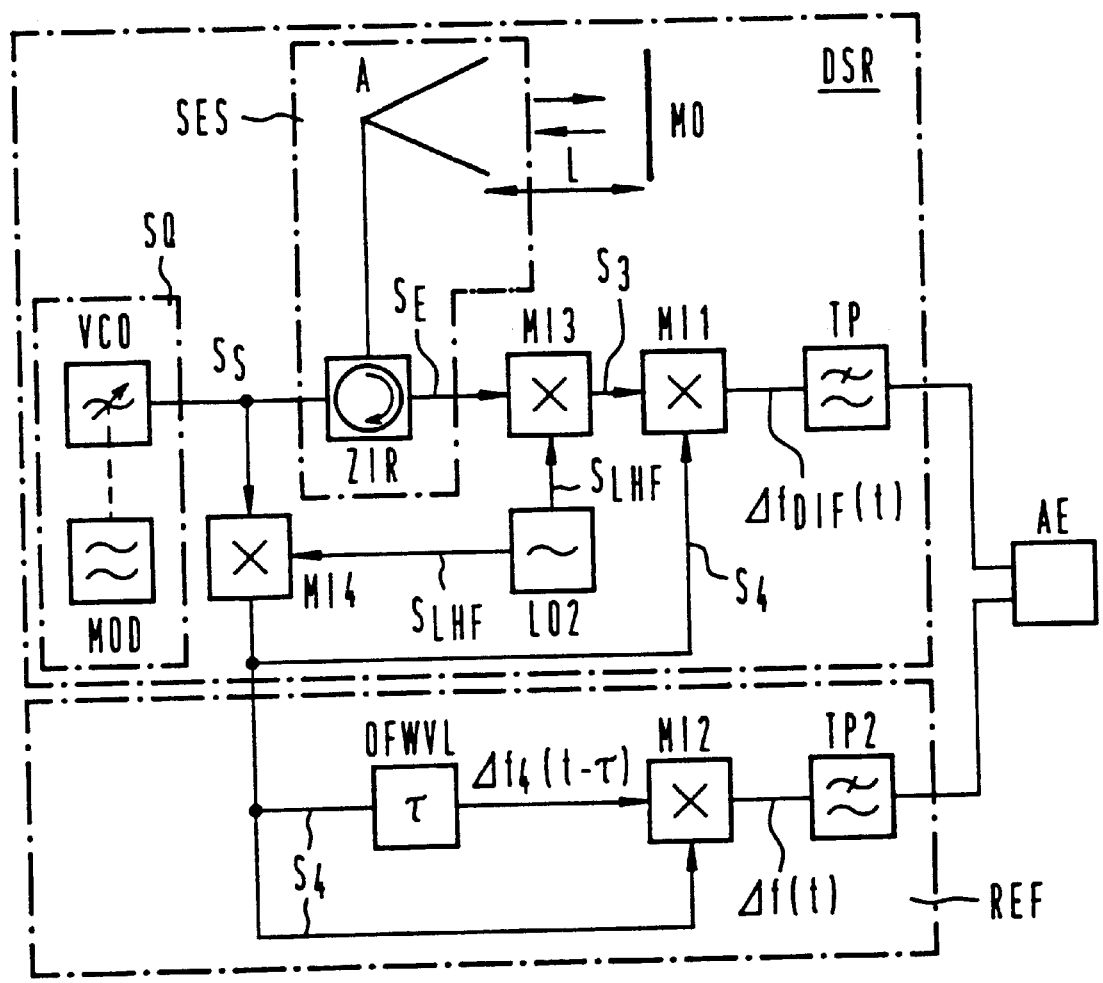
FIG. 3 shows a further embodiment of the inventive apparatus for distance measurement.

The apparatus for distance measurement shown in FIG. 3 differs from the apparatus for distance measurement shown in FIG. 2 in that the signal source SQ generates a frequency-modulated signal $S_{VCO}=S_S$ with the momentary frequency $f_T(t)$ that is higher in frequency than the frequency $f_{LHF}(t)$ of the signal $S_{LHF}$ stemming from the local oscillator LO2. I.e., the momentary frequency $f_T(t)$ of the frequency-modulated signal $S_S$ corresponds to the transmission frequency. The mixers MI4 and MI3 mix the frequency-modulated transmission signal $S_S$ having the momentary frequency $f_T(t)$ or, respectively, reception signal $S_E$ having the momentary frequency $f_T(t-T)$ with the signal $S_{LHF}$ down onto a lower frequency $\Delta f_4(t)$ or, respectively, $\Delta f_3(t)$. The frequency $\Delta f_4(t)$ of the signal $S_4$ at the output of the fourth mixer MI4 is the difference from the momentary frequency $f_T(t)$ and $f_{LHF}(t)$. The difference frequency $\Delta f_3(t)$ of the signal $S_3$ at the output of the third mixer MI3 is the difference frequency from the frequencies $f_T(t-t_L)$ and $f_{LHF}(t)$.

In the embodiment shown in FIG. 3, the transmission/reception stage SES can be replaced by a bistatic transmission/reception stage SES' according to FIG. 2. This has the advantage that the attenuation between signal source SQ and mixer ME3 is increased. Further, the transmission power can be increased as a result thereof.

The voltage-controlled oscillator VCO generates the frequency-modulated signal in the output frequency range of the measuring branch DSR. Both the transmission signal as well as the reception signal of the measuring branch DSR are mixed with the same local oscillator LO2 onto the intermediate frequency (ZF) level at which the reference branch REF is also operated.

The mixers MI1 through MI4 can be simple mixers for generating a real signal or can also be IQ mixers for generating a complex signal.

Complex signals can also be computationally acquired from the real time signal by Hilbert transformation.

For a sampling of the measured signal at every zero location of the reference signal, the delay duration τ both [. . . ] the direct sampling as well as for the computational sampling must be at least as long as the signal running time $t_L$ in order to satisfy the sampling theorem.

The evaluation of the measured signal and of the reference signal in the evaluation unit AE can ensue in the same way as described under the first embodiment according to FIG. 2.

Given the embodiment shown in FIG. 3, the average momentary frequency $f_T(t)$ typically lies at 24 GHz. The local oscillator LO2 generates a signal of the frequency $f_{LHF}(t)=21.5$ GHz. Of course, the arrangement is not limited to these frequencies.

Problems can arise given simultaneous operation of a plurality of distance measuring apparatus by a plurality of users. When a first distance measuring apparatus emits in the reception range of a second distance measuring apparatus, then this leads to disturbances that also achieve stronger reception levels in the side lobes than the comparatively weak radar echos. An arbitrarily selected, irregular modulation signal curve can be prescribed for suppressing these disturbances.

Further possibilities for improving the immunity to interference are:

1. The modulation signal stemming from the modulator MOD can be varied according to a fixed pattern.
2. The modulation signal stemming from the modulator MOD can be varied with the assistance of a random generator.
3. The switching of the curve of the modulating voltage can be undertaken after "negotiation" with the interfering transmitter that itself is likewise interfered with. Suitable functions for different users are those that correlate as slightly as possible with one another.

I claim:

1. Apparatus for distance measurement,
   wherein a signal source (SQ) is present for generating a frequency-modulated signal,
   wherein a transmission/reception stage (SES) and a first mixer (MI1) are present,
   wherein this first mixer is arranged such that it can mixer a signal coming from the transmission/reception stage with the signal generated by the signal source,
   wherein a reference unit (REF) is present that comprises a surface wave element (OFW) and a second mixer (MI2) and that is provided for delaying the signal coming from the signal source in terms of time and mixing it with the undelayed signal,
   wherein an evaluation unit (AE) is present that is arranged such that the signals formed by the mixers are supplied to it, and
   wherein this evaluation unit is configured for
   a) determining the frequency characteristic of the signal stemming from the second mixer from said signal dependent on the time for arbitrarily prescribed test subject distances, and
   b) determining the test subject distance with best coincidence by a comparison of these frequency characteristics to a signal stemming from the first mixer by correlation of evaluation according to the least error square.

2. Apparatus for distance measurement,
   wherein a signal source (SQ) is present for generating a frequency-modulated signal,
   wherein a transmission/reception stage (SES) and a first mixer (MI1) are present,
   wherein this first mixer is arranged such that it can mixer a signal coming from the transmission/reception stage with the signal generated by the signal source,
   wherein a reference unit (REF) is present that comprises a surface wave element (OFW) and a second mixer (MI2) and that is provided for delaying the signal coming from the signal source in terms of time and mixing it with the undelayed signal,
   wherein an evaluation unit (AE) is present that is arranged such that the signals formed by the mixers are supplied to it, and
   wherein this evaluation unit is configured for
   a) sampling a signal stemming from the first mixer at points in time of specific phase angles of the signal stemming from the second mixer,
   b) digitizing the sampled values and storing them together with the points in time of the occurrence of the samples, and
   c) acquiring a signal that would have derived given a linear frequency modulation, acquiring said signal by reading out the values with constant clock rate.

3. Apparatus for distance measurement,
   wherein a signal source (SQ) is present for generating a frequency-modulated signal,
   wherein a transmission/reception stage (SES) and a first mixer (MI1) are present,
   wherein this first mixer is arranged such that it can mixer a signal coming from the transmission/reception stage with the signal generated by the signal source,
   wherein a reference unit (REF) is present that comprises a surface wave element (OFW) and a second mixer (MI2) and that is provided for delaying the signal coming from the signal source in terms of time and mixing it with the undelayed signal,
   wherein an evaluation unit (AE) is present that is arranged such that the signals formed by the mixers are supplied to it, and
   wherein this evaluation unit is configured for
   a) acquiring and storing the signals stemming from the mixers with a constant sampling rate,
   b) calculating points in time with predetermined phase angles of the signal stemming from the second mixer,
   c) determining the appertaining values of the signal stemming from the first mixer at these points in time, and
   d) acquiring a signal that would have derived given a linear frequency modulation, acquiring said signal by reading out the values with a constant clock rate.

4. Apparatus according to one of the claims 1 through 3, wherein a local oscillator and a further mixer (MIL) are present between the signal source and the transmission/reception stage, wherein the local oscillator generates a signal with a frequency that is higher than the frequency stemming from the signal source, and wherein the further mixer is provided for mixing the signal of the signal source with the signal of the local oscillator.

5. Method for distance measurement, whereby a frequency-modulated signal is generated, whereby the generated signal is beamed out and a part of the signal reflected by a test subject is received, whereby the received signal is mixed with the generated signal to form a measured signal, whereby the generated signal is mixed with a signal delayed in time relative thereto to form a reference signal, whereby the frequency characteristic of the reference signal is determined dependent on the time for arbitrarily prescribed test subject distances, and whereby these frequency characteristics are compared to a measured signal and the test subject distance of best coincidence is determined by correlation or evaluation according to the least error square.

6. Method for distance measurement, whereby a frequency-modulated signal is generated, whereby the generated signal is beamed out and a part of the signal reflected by a test subject is received, whereby the received signal is mixed with the generated signal to form a measured signal, whereby the generated signal is mixed with a signal delayed in time relative thereto to form a reference signal, whereby a measured signal is sampled at points in time of specific phase angles of the reference signal, whereby the sampled values are digitized and stored together with the points in time of the occurrence of the samples, and whereby a signal that would have derived given a linear frequency modulation is acquired by readout of the values with a constant clock rate.

7. Method for distance measurement, whereby a frequency-modulated signal is generated, whereby the generated signal is beamed out and a part of the signal reflected by a test subject is received, whereby the received signal is mixed with the generated signal to form a measured signal, whereby the generated signal is mixed with a signal delayed in time relative thereto to form a reference signal, whereby the measured signal and the reference signal are acquired with constant sampling rate and stored, whereby points in time with predetermined phase angles of the reference signal are calculated, whereby the appertaining values of the measured signal are determined at these points in time, and whereby a signal that would have derived given a linear frequency modulation is acquired by readout of the values with a constant clock rate.

* * * * *